United States Patent [19]

Snedeker

[11] Patent Number: 4,978,390

[45] Date of Patent: Dec. 18, 1990

[54] WASHABLE SOLID MARKING COMPOSITION

[75] Inventor: Colin M. Snedeker, Chapman Bath, Pa.

[73] Assignee: Binney & Smith Inc., Easton, Pa.

[21] Appl. No.: 263,431

[22] Filed: Oct. 27, 1988

[51] Int. Cl.⁵ .............................................. C09D 13/00
[52] U.S. Cl. ........................................ 106/19; 106/23; 106/31; 106/32; 106/272
[58] Field of Search ..................... 106/19, 23, 31, 32, 106/272

[56] References Cited

U.S. PATENT DOCUMENTS

| | | | |
|---|---|---|---|
| 2,623,827 | 12/1952 | Moos | 106/23 |
| 2,835,604 | 5/1958 | Aronberg | 106/19 |
| 3,249,448 | 5/1966 | Coburn et al. | 106/31 |
| 3,409,574 | 11/1968 | Gros | 106/19 |
| 3,627,546 | 12/1971 | Coppeta | 106/21 |
| 3,672,842 | 6/1972 | Florin | 106/19 |
| 3,993,492 | 11/1976 | Woolly | 106/19 |
| 4,212,676 | 7/1980 | Ueda | 106/272 |

*Primary Examiner*—Willian R. Dixon, Jr.
*Assistant Examiner*—Helene Klemanski
*Attorney, Agent, or Firm*—Neuman, Williams, Anderson & Olson

[57] ABSTRACT

The present invention is a solid marking composition which may be in the form of, for example, a crayon or a marking pencil lead which is washable from fabrics, wallpaper, and painted surfaces and which also has working properties which closely approximate those achieved in conventional crayons. The composition includes a polyethylene glycol resin having a molecular weight of at least about 7,000, a water soluble surfactant which is other than a liquid at room temperatue, and a pigment. Optionally, the composition of the invention may include one or more of a compatible viscosity modifier, a compatible plasticizer, an antifoam agent, and an inert filler.

28 Claims, No Drawings

WASHABLE SOLID MARKING COMPOSITION

BACKGROUND OF THE INVENTION

1. Field of the Invention

This invention relates in general to the field of marking instruments, including crayons and pencils, and, in particular, to marking compositions for use in the manufacture of such instruments. More particularly, the invention relates to marking compositions which are washable from fabrics and surfaces.

2. Brief Description of the Prior Art

There are disclosed in the prior art a number of washable crayons, including the washable waxy crayon disclosed in U.S. Pat. No. 3,993,492. That patent discloses that an acceptable washable marking composition may be made by including a mixture of three specific polyethylene glycol materials having specified molecular weight ranges; namely, a first component of a medium molecular weight (2,000-4,500) polyethylene glycol, a second component of a high molecular weight (6,000-7,500) polyethylene glycol, and a third component of a low molecular weight (400-800) polyethylene glycol.

Many such crayons have reasonably good washability, but they are deficient not only in their physical properties but also in their marking characteristics. A truly acceptable washable crayon, like any other crayon, must, at a minimum, resist breakage, have minimal flaking, be easy to apply, and have a clean color. It is in these respects that washable crayons developed to date have been deficient.

SUMMARY OF THE INVENTION

The present invention is a solid marking composition which may, for example, be in the form of a crayon or in the form of a marking pencil lead which is washable from fabrics, wallpaper, and painted surfaces and which also has working properties which closely approximate those achieved in conventional crayons; namely, those fabricated from compositions based on paraffin wax and stearic acid.

The composition of the invention includes a polyethylene glycol resin having a molecular weight of at least about 7,000, a water soluble surfactant which is other than a liquid at room temperature, and a pigment.

Optionally, the composition of the invention may include a viscosity modifier which is compatible with the polyethylene glycol resin. This material acts as an extender, and it is preferred for use in the manufacture of crayons by conventional gravity molding techniques.

The composition of the invention may also include a compatible plasticizer in order to provide for optimization of the properties of the composition.

In addition, the marking composition of the invention may include an inert filler in such proportion as is consistent with the achievement of the desirable working properties of the composition.

It may further include an antifoam agent in order to prevent air from becoming entrained in the composition during formulation.

The composition of the invention achieves a high degree of washability from fabrics, wallpaper, upholstery, carpets, and painted surfaces, while also resisting breakage, having minimal tendency to flake, having good application characteristics, and having a clean color, free of streaking.

These properties are in large measure achieved by avoiding the use of any polyethylene glycol resins having an average molecular weight below 7000. The reason for this is two-fold. First, the higher molecular weight polyethylene glycol resins have inherently higher mechanical strength and dimensional stability than do their lower molecular weight counterparts. Second, the lower molecular weight polyethylene glycol resins are quite hygroscopic, and their absorption of atmospheric moisture adversely affects not only the feel of a crayon, but also its mechanical strength.

Further contributing to the achievement of both washability and good properties is the use in the marking composition of the invention of a water soluble surfactant which is in the form of a solid or paste, rather than a liquid. Such a surfactant permits the optimization of the other properties of the composition, such as laydown, without resort to the lower molecular weight polyethylene glycol resins relied on in some prior art compositions.

The pigment used in the composition of the invention may also be judiciously selected to enhance its washability characteristics, thus producing a marking composition having both improved working properties and improved washability.

It is therefore a general object of the invention to prepare a solid marking composition having both good washability and good working properties, including good mechanical strength, minimal flaking, easy application, and clean color.

A related object is to achieve good washability and good working properties in a marking composition while avoiding certain undesirable properties.

Another related object is to prepare a washable solid marking composition which has essentially no hygroscopic properties.

It is also an object of the invention to provide a solid marking composition which may be fabricated into a crayon form by conventional gravity molding techniques.

A still further object is to provide a solid marking composition which has good mold release properties.

Yet another object is to provide a composition in which mixing of the various components is facilitated.

Other objects and advantages of the invention will be apparent to those of ordinary skill in this art from the following detailed description.

DETAILED DESCRIPTION

The polyethylene glycol resins useful in the composition of the invention are those having a relatively high molecular weight, that is, an average molecular weight of at least 7000. In general, a workable polyethylene glycol resin must have an average molecular weight at least in the range of from about 7000 up to about 9000. For example, a resin manufactured by Union Carbide and sold under the trademark Carbowax ® 8000 will work in the composition of the invention.

Preferably, in order to obtain better mechanical strength, the resin should have an average molecular weight in the range of from about 15,000 up to about 22,000. One such resin which has been found to work particularly well in the composition of the invention is a resin which is an epoxide derivative of a polyethylene glycol resin also manufactured by Union Carbide and sold under the trademark Carbowax ® 20M. Another resin which has been found to produce results which are equivalent is a so-called trifunctional polyethylene glycol resin, again manufactured by Union Carbide and sold under the trademark Carbowax ® TPEG 20,000.

The advantages in the composition of the invention of such higher molecular weight resins are two-fold. First, such resins impart significantly better mechanical strength to the composition than do other polyethylene glycol resins having lower molecular weights. Second, the use of the higher molecular weight material avoids the undesirable properties of the lower molecular weight materials; namely, the hygroscopic nature of the lower molecular weight resins which causes them to absorb water from the atmosphere. The absorption of water into the crayon composition causes it to acquire a wet feel and to lose mechanical strength.

For the purpose of producing a marking composition useful in the form of a crayon, the polyethylene glycol resin should be present in an amount of from about 7% up to about 85% by weight, depending on the method by which the crayon is to be fabricated.

In general, a preferred range for this use is from about 10% up to about 25% by weight when the crayon is to be manufactured by conventional gravity molding techniques. Preferably the concentration is as low as possible both from an economic standpoint and in order to lower the viscosity of the composition, but not so low as to cause a loss of strength, since in crayon form, the marking composition itself supplies the needed physical integrity. The contribution of the resin to mechanical strength is, of course, of considerably less importance if the marking composition is to be used in, for example, a marking pencil in which the sheath provides the required physical integrity. Moreover, the need to maintain as low a viscosity as possible is, however, not as significant a consideration if the crayon is to be manufactured by, for example, injection molding techniques.

The composition of the invention further includes a water soluble surfactant, which is other than a liquid at room temperature. The surfactant serves a number of functions in the composition of the invention. In one respect, it acts as a compatible consistency modifier, whereby it modifies the marking characteristics of the composition. The surfactant further facilitates mixing of the formulation, acting as a dispersant for the various components of the composition, particularly the pigment. In addition, it preferably has good dimensional stability, and therefore is preferably a solid or semi-solid material, such as a paste, at room temperature. A still further preferable contribution of the surfactant is to the mold release properties of the composition. Finally, the surfactant helps to suspend the pigment in wash water, thus enhancing the detergency of the composition and further adding to its washability.

Another advantage conferred by the surfactant component is better compatibility with other ingredients, since polyethylene glycol resin alone is not compatible with the more hydrophobic ingredients which may be used in the composition.

Among the surfactant materials which will function effectively in the composition of the invention are the mono esters of polyols and fatty acids, diesters of polyols and fatty acids, non-ionic block copolymers of propylene oxide and ethylene oxide, ethylene oxide condensation products, nonylphenol ethoxylates, the ethyleneoxy ethanols (sold under the tradename Igepal TM), and polyoxyethylene ether alcohol (sold under the tradename Renex TM 30). Of course, mixtures of these materials may also advantageously be used to suit specific manufacturing conditions or to obtain a proper balance of properties in a particular form of the composition.

Other surfactant materials, which may be liquids or solids, may, of course, be added to the composition for the purpose of modifying one or more working or formulating properties.

The use of these and many other equivalent materials is within the knowledge and skill of those familiar with the art.

When the composition of the invention is to be employed in a gravity molded crayon product, the preferred surfactants are a polyethylene glycol monostearate (e.g., one having a molecular weight of about 6000), a polyethylene glycol distearate (e.g., one having a molecular weight of about 6000), glycerol monostearate, and mixtures of these materials.

Particularly suited for use in a gravity molded crayon product is a mixture of polyethylene glycol monostearate and polyethylene glycol distearate. Polyethylene glycol monostearate tends to give the product a softer laydown, while polyethylene glycol distearate tends to give it a harder laydown. The object is to balance the two in order achieve the proper balance of properties. A proper balance permits optimum properties to be achieved in a gravity molded product Moreover, since this is done in the absence of any lower molecular weight polyethylene glycol resins, there is no sacrifice of strength, since these esters have essentially no hygroscopic properties.

The surfactant component of the composition may be present in an amount of up to about 60% by weight. It is contemplated, however, that little or no surfactant could be used in an injection molded product, though the composition would lose the benefit of the detergency contributed by the surfactant.

A suitable amount of surfactant in a gravity molded composition is from about 25% up to about 40% by weight, and that is the preferred range.

In order to obtain optimal washability characteristics, it is preferable to judiciously select the pigment to be employed in the marking composition of the invention. One important aspect of the selection of a pigment is to select materials which are known to be or can be made to be substantially free of water soluble impurities which can induce staining. In particular, it is important to select pigments which have essentially no dye-containing components, since dyes chemically bind to the materials to which they impart color and are not washed away by, for example, water-based detergent solutions. It is therefore preferable to avoid dye-containing materials such as lakes when selecting pigments for the marking composition of the invention.

Another characteristic of the pigment which may be controlled in order to maximize the washability characteristics of the marking composition of the invention is particle size. By utilizing a pigment having a sufficiently large particle size, one may minimize the retention by textile fibers of pigment particles which may otherwise become embedded in the textile matrix and therefore be less readily suspended and dispersed in wash water by the action of detergents and other surfactant materials. Thus, it has been found that washability may be maximized by selecting a pigment which has a particle size of at least about 1 micron.

The amount of pigment to be included in the marking composition of the invention may vary considerably, depending on the relative coloring capacity of the pigment; that is, what quantity of pigment is required to adequately color a given amount of the marking composition. However, in general, an acceptable crayon formulation of the composition will usually contain from about 2% up to about 10% pigment by weight.

The composition of the invention also optionally includes a viscosity modifier which is compatible with the polyethylene glycol resin. In this context, the viscosity modifier is compatible if it has relatively high solubility in water, that is, a high HLB. Inclusion of the viscosity modifier lowers the viscosity of the composition and it therefore permits the marking composition to be fabricated into, for example, crayon form by conventional gravity molding techniques. Without the viscosity modifier, this would not be possible, in view of the relatively high viscosity of the high molecular weight polyethylene glycol resins.

In general, one may use as a viscosity modifier the least expensive material which is compatible with the polyethylene glycol resin. Suitable materials include the fatty alcohols having from 14 to 18 carbon atoms. Particularly useful are stearyl alcohol, cetyl alcohol, and mixtures thereof, with stearyl alcohol being the most preferred.

For the purpose of producing a marking composition useful in the form of a crayon, the compatible viscosity modifier may be present in an amount of up to about 40% by weight. The preferred range, however, is from about 20% up to about 40% by weight. At higher levels, the material will be soluble in the polyethylene glycol resin matrix and will cause a loss of strength which is unacceptable in this application of the marking composition of the invention. Most preferred in this application is the range of from about 30% up to about 40% by weight.

Optionally, the composition of the invention also includes a compatible plasticizer. Preferably, the plasticizer is a non-volatile liquid at room temperature. Particular preferred plasticizers are oleyl alcohol and propylene glycol, and oleyl alcohol provides especially good marking properties.

It has been found that good results are obtained when the plasticizer is present in an amount of from about 2% up to about 6% by weight, though that range is by no means critical.

It is also advantageous in many instances to include in the composition of the invention an antifoam agent in order to eliminate entrained air during formulation. Entrained air in the composition results in bubbles in the solid matrix, and such bubbles tend to adversely affect both the mechanical strength and the application properties of a crayon.

Suitable antifoam agents include such materials as the silicone defoamers and the petroleum hydrocarbon defoamers.

These antifoam agents are effective, in general, when present in an amount of from about 0.1% up to about 1.0% by weight. The preferred range, however, is from about 0.2% up to about 0.5% by weight.

Finally, as is well known in the art, the composition of the invention may further include an inert filler. Typical materials used as fillers are clay, calcium carbonate, talc, and mica, though many others may serve equally well.

Such materials may be present in the composition in amounts of up to about 75% by weight, provided that the other desirable properties of the composition are maintained. In general, however, for the purpose of producing a gravity molded crayon, a preferred range is from about 5% up to about 15% by weight.

The following are examples of formulations falling within the scope of this invention which are suitable for fabricating washable crayons by conventional gravity molding techniques. Other formulations of washable solid marking compositions, such as compositions suitable for use in fabricating marking pencils, in fabricating injection molded marking instruments and the like, are, of course within the scope of the foregoing disclosure. Thus, the following examples are set forth by way of illustration only, and not by way of limitation of the scope of the invention.

EXAMPLES 1-3

Washable crayons were produced by melt mixing the following, the amount of each component being expressed in weight per cent:

| Component | Example 1 | Example 2 | Example 3 |
|---|---|---|---|
| polyethylene glycol (m.w. = 15,000–20,000) | 21.0 | 20.7 | 20.1 |
| stearyl alcohol | 21.0 | 20.7 | 20.1 |
| polyethylene glycol distearate (m.w. = 6,000) | 28.0 | — | 26.8 |
| oleyl alcohol | 6.3 | 4.1 | — |
| polyethylene glycol monostearate (m.w. = 6,000) | 10.5 | 27.6 | 10.1 |
| nonionic block copolymer of propylene oxide and ethylene oxide | — | 10.3 | — |
| propylene glycol (m.w. = 2,000) | — | — | 6.7 |
| calcium carbonate | 10.5 | 13.8 | 13.4 |
| pigment* | 2.7 | 2.8 | 2.8 |
| Totals | 100.0 | 100.0 | 100.0 |

*pigment selected from: benzidine yellow; dianisidine orange; lithol rubine; iron blue The crayons formed these compositions had acceptable working properties and were washable from surfaces.

EXAMPLE 4

A washable crayon was produced by melt mixing the following:

| Component | Weight (gms) | Weight % |
|---|---|---|
| polyethylene glycol (m.w. 15,000–20,000) | 15.0 | 20.69 |
| stearyl alcohol | 15.0 | 20.69 |
| polyethylene glycol monostearate 6000 | 20.0 | 27.58 |
| nonionic block copolymer of propylene oxide and ethylene oxide | 7.5 | 10.34 |
| oleyl alcohol | 3.0 | 4.14 |
| calcium carbonate | 10.0 | 13.79 |
| dry color blue | 2.0 | 2.76 |
| | 72.5 | 99.99 |

The crayon formed from this composition applied well, having a slight drag, and it covered evenly. Marks made with the crayon were washed with water from skin, painted walls, and wallpaper.

EXAMPLE 5

A washable crayon was produced by melt mixing the following:

| Component | Weight (lbs) | Weight % |
| --- | --- | --- |
| polyethylene glycol (m.w. 15,000-20,000) | 15 | 10.3 |
| stearyl alcohol | 39 | 26.7 |
| polyethylene glycol monostearate (m.w. = 6000) | 24 | 16.4 |
| polyethylene glycol distearate (m.w. = 6000) | 35 | 24.0 |
| oleyl alcohol | 9 | 6.2 |
| talc (300 mesh) | 20 | 13.7 |
| dry color red | 4 | 3.7 |
| | 146 | 100.0 |

The composition so formed was found to be readily fabricated into crayon form by conventional gravity molding techniques.

Once fabricated into crayon form, the composition was tested to determine its washability properties. In each case, the tested surface or fabric was marked in five passes of the crayon using moderate pressure The marks were left for 24 hours before the washability tests were performed. On a standard white polyester-cotton blend fabric, the marks were completely removed in a single wash cycle at 105° F. From a wall surface painted with an inexpensive flat latex wall paint, the composition was completely washed from the surface with water. The same was true when the surface was a scrubbable vinyl wallpaper. On upholstery, removal was somewhat more difficult, requiring a soap or detergent in addition to the water. A small amount of residue remained on the upholstered surface, but removal was far superior to that achieved in the same test of a standard paraffin wax and stearic acid crayon. On wood furniture, ceramic floor tile and sheet flooring, such as linoleum, the marks were readily and completely removed with a soap and water wash.

EXAMPLES 6-7

Washable crayons were produced by melt mixing the following, the amount of each component being expressed in weight per cent:

| Component | Example 6 | Example 7 |
| --- | --- | --- |
| polyethylene glycol (m.w. = 15,000-20,000) | 8.98 | — |
| trifunctional polyethylene glycol (m.w. = 18,000-22,000) | — | 10.20 |
| stearyl alcohol | 23.95 | 27.21 |
| polyethylene glycol distearate (m.w. = 6,000) | 23.95 | 23.81 |
| oleyl alcohol | 5.38 | 6.12 |
| polyethylene glycol monostearate (m.w. = 6,000) | 14.37 | 16.32 |
| talc (300 mesh) | 11.97 | 13.60 |
| modified wood rosin | 8.98 | — |
| pigment | 2.39 | 2.72 |
| Totals | 99.97 | 99.98 |

The crayons formed from these conditions were found to have equivalent strength; however, the composition of Example 6 was found to be slightly less washable on account of the presence of the wood resin.

EXAMPLE 8

A washable crayon was produced by melt mixing the following:

| Component | Weight (gms) | Weight % |
| --- | --- | --- |
| polyethylene glycol (m.w. = 7,000-9,000) | 15.0 | 10.0 |
| polyethylene glycol monostearate (m.w. = 6,000) | 24.0 | 16.0 |
| polyethylene glycol distearate (m.w. = 6,000) | 35.0 | 24.0 |
| stearyl alcohol | 40.0 | 27.0 |
| oleyl alcohol | 9.0 | 6.0 |
| talc (300 mesh) | 20.0 | 14.0 |
| dry color | 4.0 | 3.0 |
| | 147.0 | 100.0 |

The crayon formed from this composition had acceptable working properties and was washable from surfaces.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention.

What is claimed is:

1. A solid marking composition comprising:
   (a) from about 7% to about 85% by weight of a polyethylene glycol resin; and
   (b) from about 2% to about 10% by weight of a pigment, the balance comprising at least one material selected from the group consisting of a surfactant, said surfactant being other than a liquid at room temperature, a compatible viscosity modifier, a plasticizer, and a filler, said composition being substantially free of polyethylene glycol resins having an average molecular weight of less than about 7,000.

2. A composition according to claim 1, further comprising a compatible viscosity modifier.

3. A marking composition according to claim 2, wherein said viscosity modifier is a fatty alcohol having from 14 to 18 carbon atoms.

4. A marking composition according to claim 3, wherein said viscosity modifier is selected from the group consisting of stearyl alcohol, cetyl alcohol, and mixtures thereof.

5. A composition according to claim 2, wherein said compatible viscosity modifier is present in an amount of from about 20% up to about 40% by weight.

6. A composition according to claim 2, further comprising a compatible plasticizer.

7. A composition according to claim 6, wherein said plasticizer is present in an amount of from about 2% to about 6% by weight.

8. A composition according to claim 6, wherein said plasticizer is a non-volatile liquid at room temperature.

9. A composition according to claim 8, wherein said plasticizer is selected from the group consisting of oleyl alcohol and propylene glycol.

10. A composition according to claim 2, further comprising a filler.

11. A composition according to claim 10, wherein said filler is selected from the group consisting of clay, calcium carbonate, talc, and mica.

12. A composition according to claim 11, wherein said filler is present in an amount of from 0% to about 75% by weight.

13. A composition according to claim 12, wherein said filler is present in an amount of from about 5% to about 15% by weight.

14. A composition according to claim 1, wherein said surfactant is selected from the group consisting of mono esters of polyols and fatty acids, diesters of polyols and fatty acids, non-ionic block copolymers of propylene oxide and ethylene oxide, ethylene oxide condensation products, nonylphenol ethoxylates, ethyleneoxy ethanols, and mixtures thereof 15. A composition according to claim 14, wherein said surfactant is selected from the group consisting of polyethylene glycol monostearate, polyethylene glycol distearate, glycerol monostearate, and mixtures thereof.

16. A composition according to claim 15, wherein said surfactant is a mixture of polyethylene glycol monostearate and polyethylene glycol distearate.

17. A composition according to claim 2, wherein said polyethylene glycol resin is present in an amount from about 10% to about to 25% by weight.

18. A composition according to claim 1, wherein said polyethylene glycol resin is present in an amount of from about 10% to about 25% by weight.

19. A composition according to claim 1, wherein said polyethylene glycol resin has an average molecular weight of at least about 15,000.

20. A composition according to claim 1, wherein said pigment has a particle size of at least about 1 micron.

21. A composition according to claim 1, wherein said pigment is substantially free of water soluble impurities.

22. A composition according to claim 1, further comprising an antifoam agent.

23. A composition according to claim 22, wherein said antifoam agent is selected from the group consisting of silicone defoamers and petroleum hydrocarbon defoamers.

24. A composition according to claim 22, wherein said antifoam agent is present in an amount of from about 0.1% up to about 1.0% by weight.

25. A composition according to claim 24, wherein said antifoam agent is present in an amount of from about 0.2% to about 0.5% by weight.

26. A solid marking composition comprising:
 (a) from about 10% to about 25% of a polyethylene glycol resin;
 (b) from about 20% to about 40% of a compatible viscosity modifier;
 (c) from about 25% to about 40% of a water soluble surfactant, said surfactant being other than a liquid at room temperature;
 (d) from about 2% to about 6% of a compatible plasticizer;
 (e) from about 5% to about 15% of a filler;
 (f) from about 0.1% to about 1.0% of an antifoam agent; and,
 (g) from about 2% to about 10% of a pigment, said pigment being substantially free of water soluble impurities and having a particle size of at least about 1 micron,
said composition being substantially free of polyethylene glycol resins having an average molecular weight of less than about 7,000.

27. A solid marking composition comprising:
 (a) from about 10% to about 25% of a polyethylene glycol resin having a molecular weight of at least about 15,000;
 (b) from about 20% to about 40% stearyl alcohol;
 (c) from about 25% to about 40% of a surfactant which is other than a liquid at room temperature, said surfactant comprising a mixture of polyethylene glycol monostearate and polyethylene glycol distearate;
 (d) from about 2% to about 6% oleyl alcohol;
 (e) from about 5% to about 15% of a filler;
 (f) from about 0.2% to about 0.5% of an antifoam agent; and,
 (g) from about 2% to about 10% of a pigment, said pigment being substantially free of water soluble impurities and having a particle size of at least about 1 micron,
said composition being substantially free of polyethylene glycol resins having an average molecular weight of less than about 7,000.

28. A composition according to claim 1 in the form of a crayon stick.

* * * * *

UNITED STATES PATENT AND TRADEMARK OFFICE
CERTIFICATE OF CORRECTION

PATENT NO. : 4,978,390

DATED : December 18, 1990

INVENTOR(S) : Colin M. Snedeker

It is certified that error appears in the above-indentified patent and that said Letters Patent is hereby corrected as shown below:

On the title page, item [56]:

Correct Primary Examiner's Name "Willian R. Dixon, Jr." should be -- William R. Dixon, Jr. --.

Column 4, line 25 between "product" and "Moreover" add a period (.);

Column 5, line 30 between "will" and "be" add -- not --;

Column 6, line 40 between "formed" and "these" add -- from --;

Column 7, line 21 between "pressure" and "The" add a period (.);

Column 7, line 61 delete "conditions" and substitute therefor -- compositions --.

UNITED STATES PATENT AND TRADEMARK OFFICE
CERTIFICATE OF CORRECTION

PATENT NO. : 4,978,390
DATED : December 18, 1990
INVENTOR(S) : Colin M. Snedeker It is certified that error appears in the above-indentified patent and that said Letters Patent is hereby corrected as shown below:

Claim 6, column 8, line 51 delete "2" and substitute therefor -- 1 --;

Claim 10, column 8, line 61 delete "2" and substitute therefor -- 1 --;

Claim 12, column 8, line 66 delete "11" and substitute therefor -- 10 --;

Claim 17, column 9, line 18 delete "2" and substitute therefor -- 1 --; and

Signed and Sealed this

Twenty-sixth Day of October, 1993

Attest:

BRUCE LEHMAN

*Attesting Officer*     *Commissioner of Patents and Trademarks*